US011522645B2

(12) United States Patent
Chen et al.

(10) Patent No.: US 11,522,645 B2
(45) Date of Patent: Dec. 6, 2022

(54) COMMUNICATION SYSTEM, DATA TRANSMISSION METHOD AND BASE STATION THEREOF FOR CO-TRANSMISSION OF A DATA PACKET

(71) Applicant: Arcadyan Technology Corporation, Hsinchu (TW)

(72) Inventors: Hsueh-Chien Chen, Hsinchu (TW); Wei-Yang Teng, Hsinchu (TW)

(73) Assignee: Arcadyan Technology Corporation

( * ) Notice: Subject to any disclaimer, the term of this patent is extended or adjusted under 35 U.S.C. 154(b) by 57 days.

(21) Appl. No.: 17/216,382

(22) Filed: Mar. 29, 2021

(65) Prior Publication Data

US 2021/0314091 A1    Oct. 7, 2021

(30) Foreign Application Priority Data

Apr. 6, 2020 (TW) ................................. 109111531

(51) Int. Cl.
*H04L 1/18* (2006.01)
*H04W 28/22* (2009.01)
*H04W 80/02* (2009.01)

(52) U.S. Cl.
CPC ............ *H04L 1/189* (2013.01); *H04W 28/22* (2013.01); *H04W 80/02* (2013.01)

(58) Field of Classification Search
CPC .............. H04L 1/189; H04L 1/1893; H04L 2001/0097; H04L 1/0002; H04W 28/22; H04W 80/02; H04W 28/06
See application file for complete search history.

(56) References Cited

U.S. PATENT DOCUMENTS 9,596,638 B2    3/2017 Damji et al.
2018/0332342 A1* 11/2018 Wu ..................... H04N 21/6375
(Continued)

FOREIGN PATENT DOCUMENTS

TW    201902185 A    1/2019
WO    2017182927 A1    10/2017

OTHER PUBLICATIONS

Communication corresponding to European Application No. 21166596.3 and issued by the European Patent Office dated Sep. 1, 2021, 8 pages.

(Continued)

*Primary Examiner* — Afshawn M Towfighi
(74) *Attorney, Agent, or Firm* — Innovation Counsel LLP

(57) ABSTRACT

A communication system, a data transmission method and a base station thereof are provided. The communication system includes a first base station and a second base station. The first base station includes a physical layer unit, a MAC layer unit and a PDCP layer unit. The physical layer unit is configured to transmit with a user equipment through a transmission channel. The MAC layer unit is configured to determine whether a retransmission ratio of the transmission channel is higher than a first threshold and to determine whether a transmission speed of the transmission channel is lower than a second threshold. If the retransmission ratio is higher than the first threshold and/or the transmission speed is lower than the second threshold, the first base station copy a packet and then transmits the copied packet to the second base station which accordingly transmits the copied packet to the user equipment.

20 Claims, 6 Drawing Sheets

(56) References Cited

U.S. PATENT DOCUMENTS

| | | | |
|---|---|---|---|
| 2019/0158993 A1* | 5/2019 | Kwon | H04L 5/0091 |
| 2019/0373440 A1 | 12/2019 | Agiwal et al. | |
| 2019/0393989 A1* | 12/2019 | Jung | H04W 24/02 |
| 2020/0059821 A1 | 2/2020 | Wirth et al. | |
| 2020/0145146 A1* | 5/2020 | Decarreau | H04L 1/08 |
| 2020/0275295 A1* | 8/2020 | Liu | H04L 1/22 |

OTHER PUBLICATIONS

Communication corresponding to Taiwan Application No. 10911531 and issued by Taiwan Intellectual Property Office dated Jan. 29, 2021, 4 pages.

\* cited by examiner

COMMUNICATION SYSTEM, DATA TRANSMISSION METHOD AND BASE STATION THEREOF FOR CO-TRANSMISSION OF A DATA PACKET

This application claims the benefit of Taiwan application Serial No. 109111531, filed Apr. 6, 2020, the subject matter of which is incorporated herein by reference.

BACKGROUND OF THE INVENTION

Field of the Invention

The invention relates in general to an electronic system and an operating method and elements thereof, and more particularly to a communication system, a data transmission method and a base station thereof.

Description of the Related Art

Along with the development of mobile communication technology, the fourth generation of mobile phone mobile communication technology standards (4G) and the fifth generation of mobile phone mobile communication technology standards (5G) have been provided. The ultra-reliable and low latency communications (uRLLC) standard is a future standard of the mobile communication technology and will be used in the application fields having high requirements of latency and reliability such as IoT, self-driving, smart grid, VR, and factory automation.

However, when the transmission channel is in a poor condition, the communication system needs to spend a considerable amount of time to repeatedly transmit the packets and therefore can hardly meet the requirement of low latency. Besides, when the transmission channel is in a poor condition, several packets may be lost, and it is difficult to meet the requirement of ultra-reliability.

Therefore, it has become a prominent task for the industries to provide a communication technology to maintain ultra-reliable and low latent communications.

SUMMARY OF THE INVENTION

The present invention relates to a communication system, a data transmission method and a base station thereof capable of collaborating a first base station and a second base station to reduce latency and increase reliability to meet the requirements of the ultra-reliable and low latency communications (uRLLC).

According to one embodiment of the present invention, a communication system is provided. The communication system includes a first base station and a second base station. The first base station includes a physical layer unit, a media access control layer unit (MAC layer unit) and a packet data convergence protocol layer unit (PDCP layer unit). The physical layer unit is configured to transmit with a user equipment through a transmission channel. The MAC layer unit is configured to determine whether a retransmission ratio of the transmission channel is higher than a first threshold and to determine whether a transmission speed of the transmission channel is lower than a second threshold. If the retransmission ratio of the transmission channel is higher than the first threshold and/or the transmission speed of the transmission channel is lower than the second threshold, the MAC layer unit of the first base station emits a co-transmission activation command for enabling the first base station to copy a packet and then transmit the copied packet to the second base station, which accordingly transmits the copied packet to the user equipment.

According to another embodiment of the present invention, a data transmission method of a communication system is provided. The communication system includes a first base station and a second base station. The data transmission method includes the following steps. Whether a retransmission ratio of a transmission channel between the first base station and a user equipment is higher than a first threshold is determined by the first base station. Whether a transmission speed of the transmission channel is lower than a second threshold is determined by the first base station. If the retransmission ratio of the transmission channel is higher than the first threshold and/or the transmission speed of the data is lower than the second threshold, the first base station emits a co-transmission activation command to copy a packet and then transmit the copied packet to the second base station, which accordingly transmits the copied packet to the user equipment.

According to an alternate embodiment of the present invention, a base station is provided. The base station includes a physical layer unit, a media access control layer unit (MAC layer unit) and a packet data convergence protocol layer unit (PDCP layer unit). The physical layer unit is configured to transmit with a user equipment through a transmission channel. The MAC layer unit is configured to determine whether a retransmission ratio of the transmission channel is higher than a first threshold and to determine whether a transmission speed of the transmission channel is lower than a second threshold. If the retransmission ratio of the transmission channel is higher than the first threshold and/or the transmission speed of the transmission channel is lower than the second threshold, the MAC layer unit emits a co-transmission activation command for enabling the base station to copy a packet and then transmit the copied packet to a co-transmitting base station, which accordingly transmits the copied packet to the user equipment.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
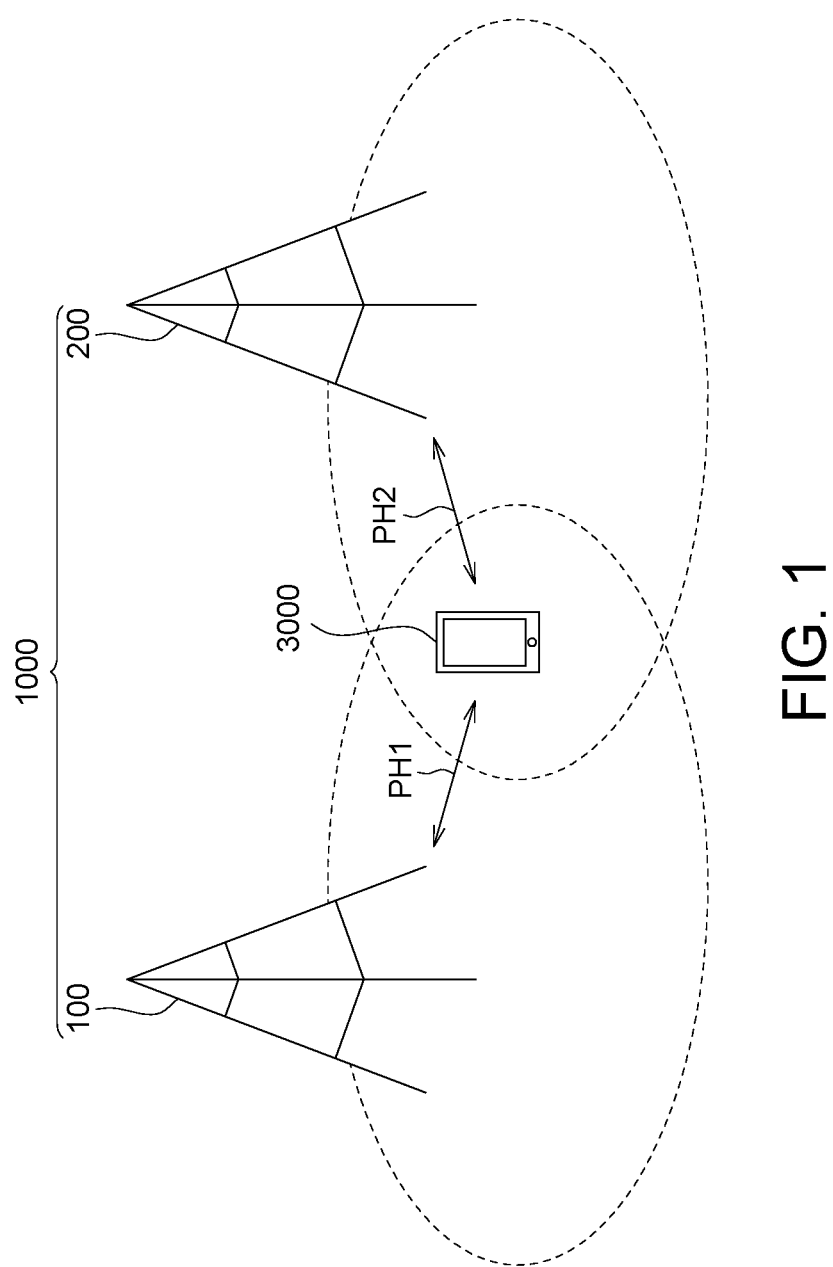
FIG. 1 is a relation diagram of a communication system and a user equipment according to an embodiment.

Referring to FIG. 1, a relation diagram of a communication system 1000 and a user equipment 3000 according to an embodiment is shown. The communication system 1000 at least includes a first base station 100 and a second base station 200. The first base station 100 and the second base station 200 can be realized by macro cells or small cells. Examples of small cells include femtocell, picocell and microcell. A user equipment 3000 is within the transmission coverage of the first base station 100 and the second base station 200. The user equipment 3000 can be realized by a mobile phone, a PC tablet or a laptop. A first transmission channel PH1 is disposed between the first base station 100 and the user equipment 3000. A second transmission channel PH2 is disposed between the second base station 200 and the user equipment 3000.

The user equipment 3000 can transmit with the first base station 100 through the first transmission channel PH1. When the first transmission channel PH1 is in a good condition, it is easy to meet the requirements of the ultra-reliable and low latency communications (uRLLC). However, when the first transmission channel PH1 is in a poor condition, the first base station 100 needs to spend a considerable amount of time to repeatedly transmit the packets and may lose several packets, and it is difficult to meet the requirements of the ultra-reliable and low latency communications (uRLLC).

Figure 2:
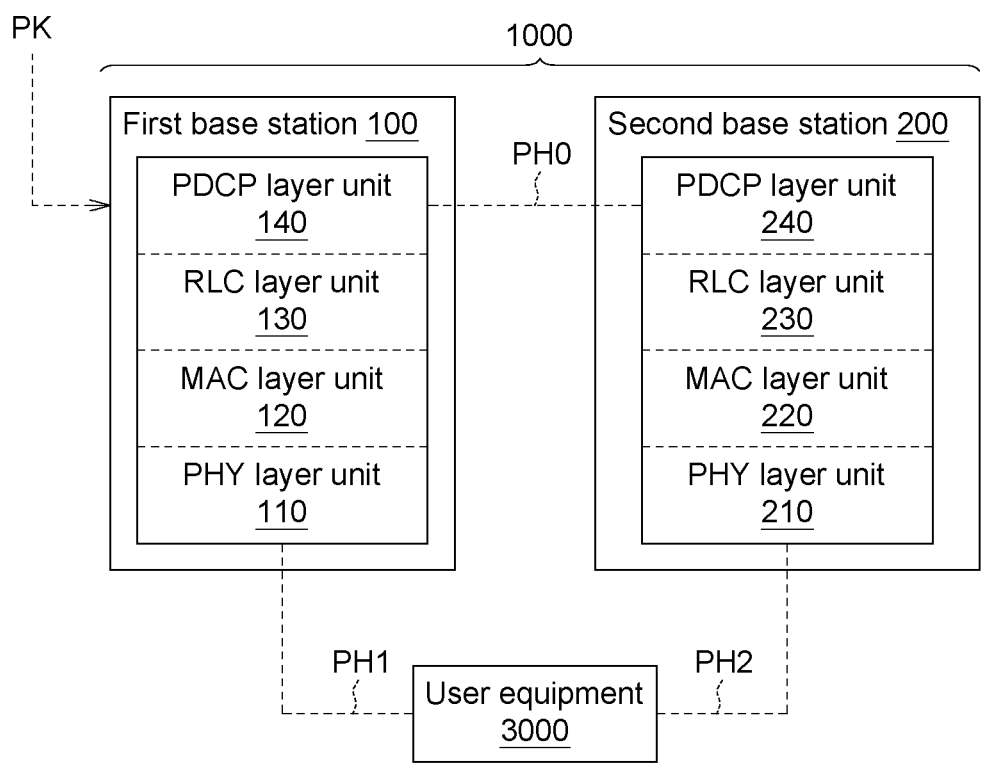
FIG. 2 is a schematic diagram of the communication system and the user equipment according to an embodiment.

In the present embodiment, the collaboration technology of the first base station 100 and the second base station 200 can reduce latency and increase reliability to meet the requirements of the ultra-reliable and low latency communications (uRLLC). Referring to FIG. 2, a schematic diagram of the communication system 1000 and the user equipment 3000 according to an embodiment is shown. The communication system 1000 includes a first base station 100 and a second base station 200. The first base station 100 includes a physical layer unit (PHY layer unit) 110, a media access control layer unit (MAC layer unit) 120, a radio link control layer unit (RLC layer unit) 130 and a packet data convergence protocol layer unit (PDCP layer unit) 140. The second base station 200 includes a PHY layer unit 210, an MAC layer unit 220, an RLC layer unit 230 and a PDCP layer unit 240. The PHY layer units 110 and 210, the MAC layer units 120 and 220, the RLC layer units 130 and 230 and the PDCP layer units 140 and 240 are layers under the communication protocols and can be realized by such as a circuit, a chip, a circuit board, several array codes, or a storage device for storing codes.

A base station inter-channel PH0 is disposed between the first base station 100 and the second base station 200. A first transmission channel PH1 is disposed between the first base station 100 and the user equipment 3000. A second transmission channel PH2 is disposed between the second base station 200 and the user equipment 3000. When the first transmission channel PH1 is in a good condition, the packet PK received by the first base station 100 can be transmitted to the user equipment 3000 through the first transmission channel PH1. When the first transmission channel PH1 is in a poor condition, the packet PK received by the first base station 100 can be transmitted to the second base station 200 through the base station inter-channel PH0, then the second base station 200 further transmits the packet PK to the user equipment 3000 through the second transmission channel PH2. Thus, through the collaboration of the first base station 100 and the second base station 200, the communication system 1000 can recue latency and increase reliability to meet the requirement of ultra-reliable and low latency communications (uRLLC).

Figure 3A:
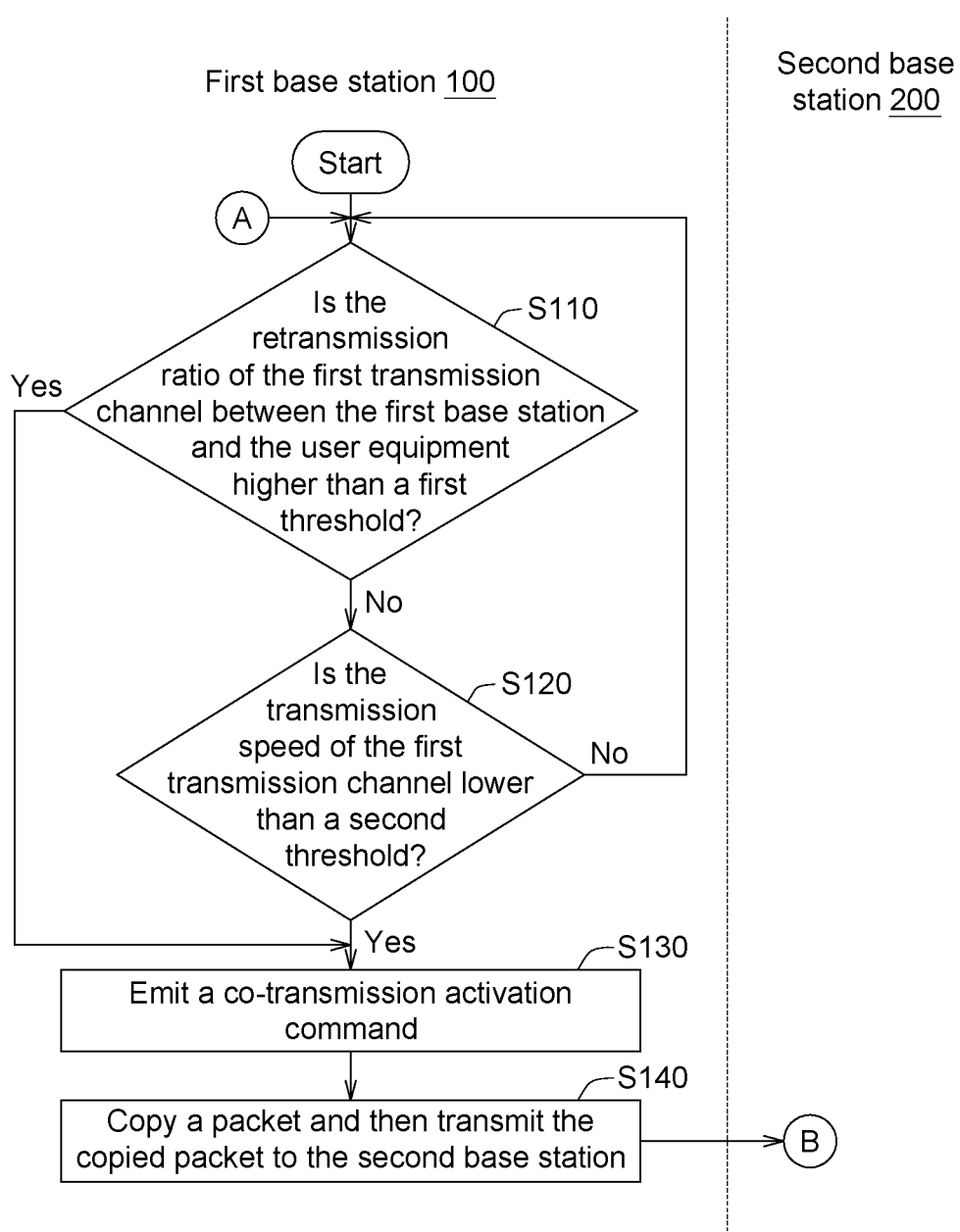
FIGS. 3A to 3B are a flowchart of a transmission method of the communication system according to an embodiment.
Figure 3B:
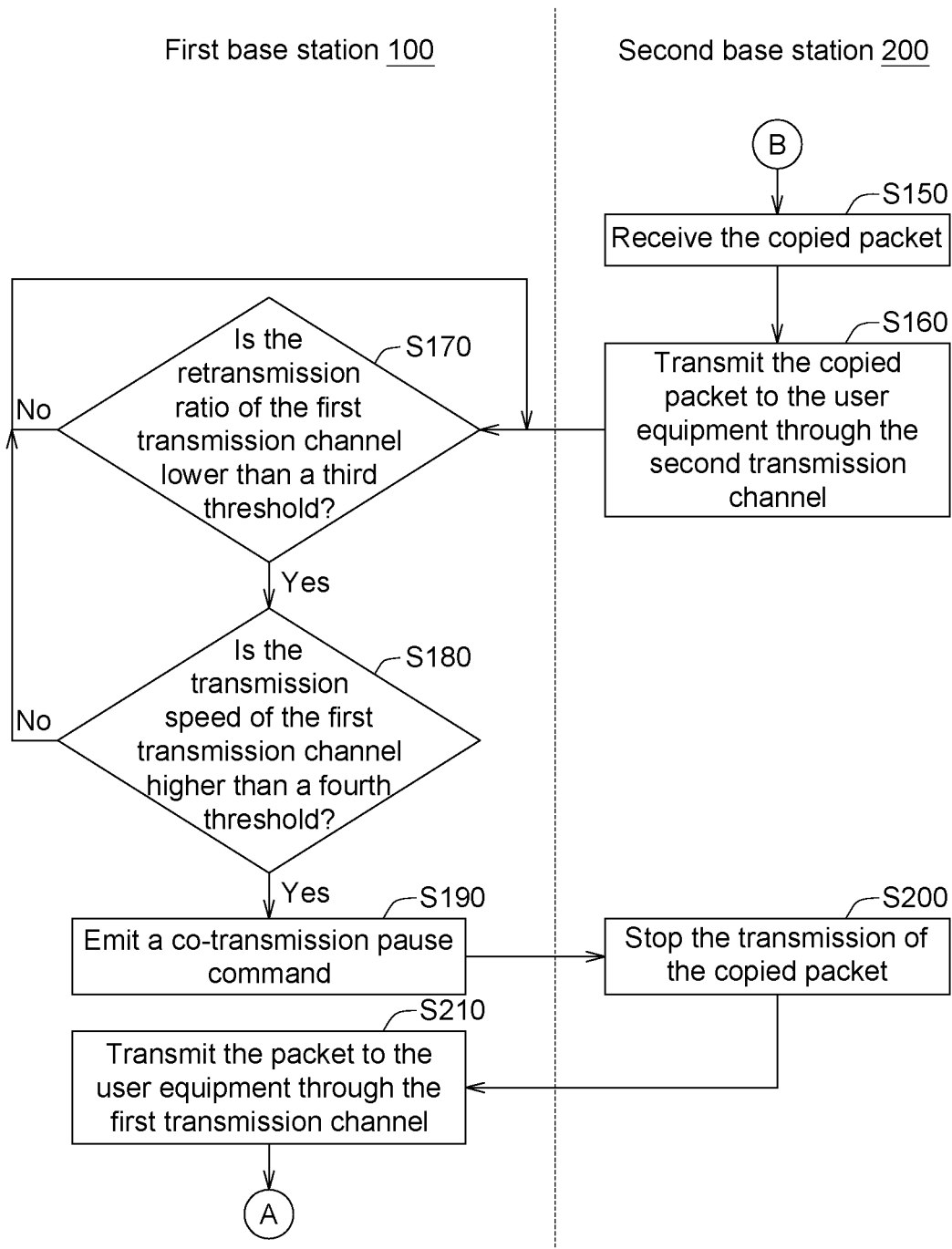
Figure 4:
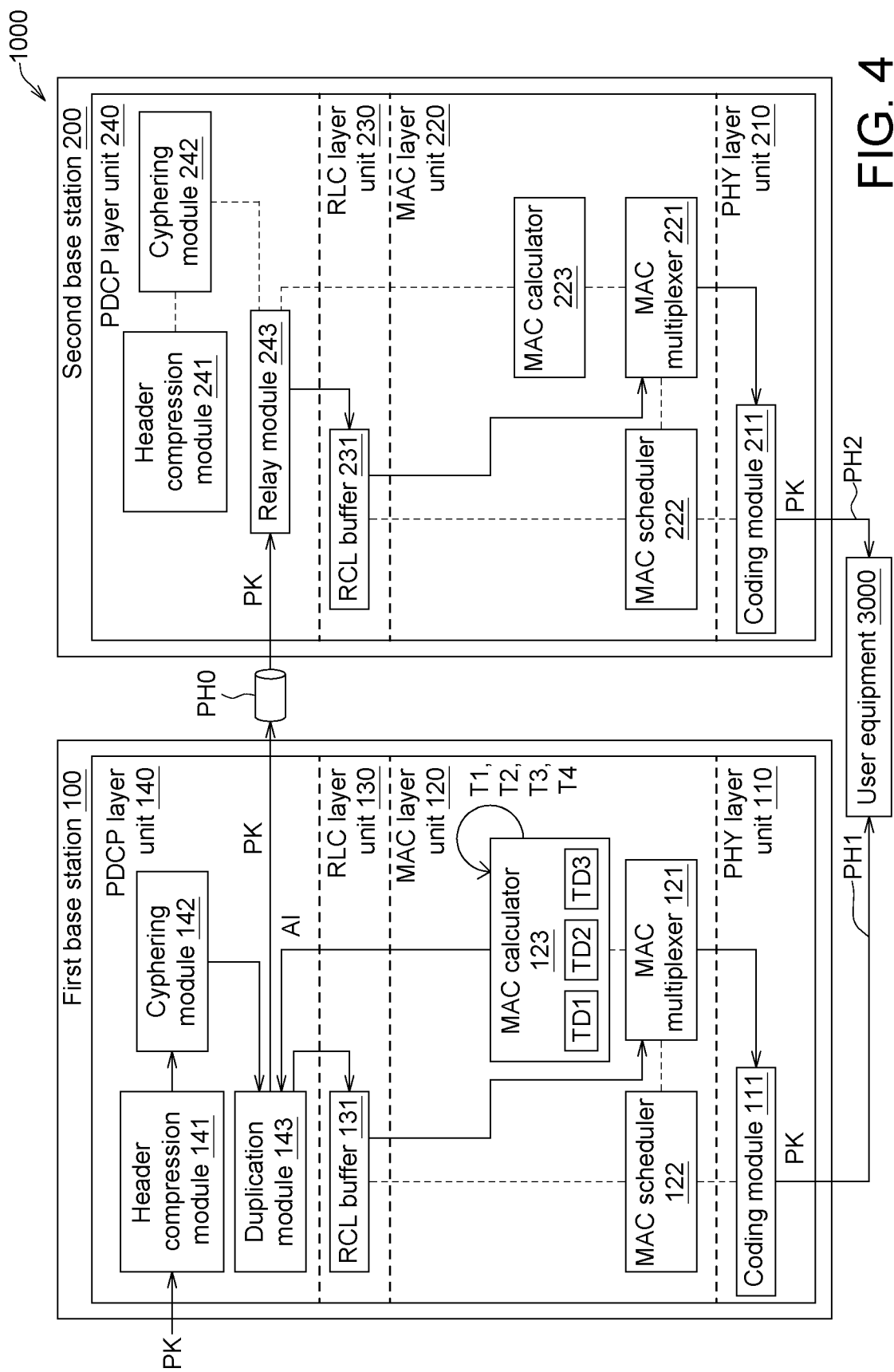
FIG. 4 is a schematic diagram of a co-transmission pause procedure.
Figure 5:
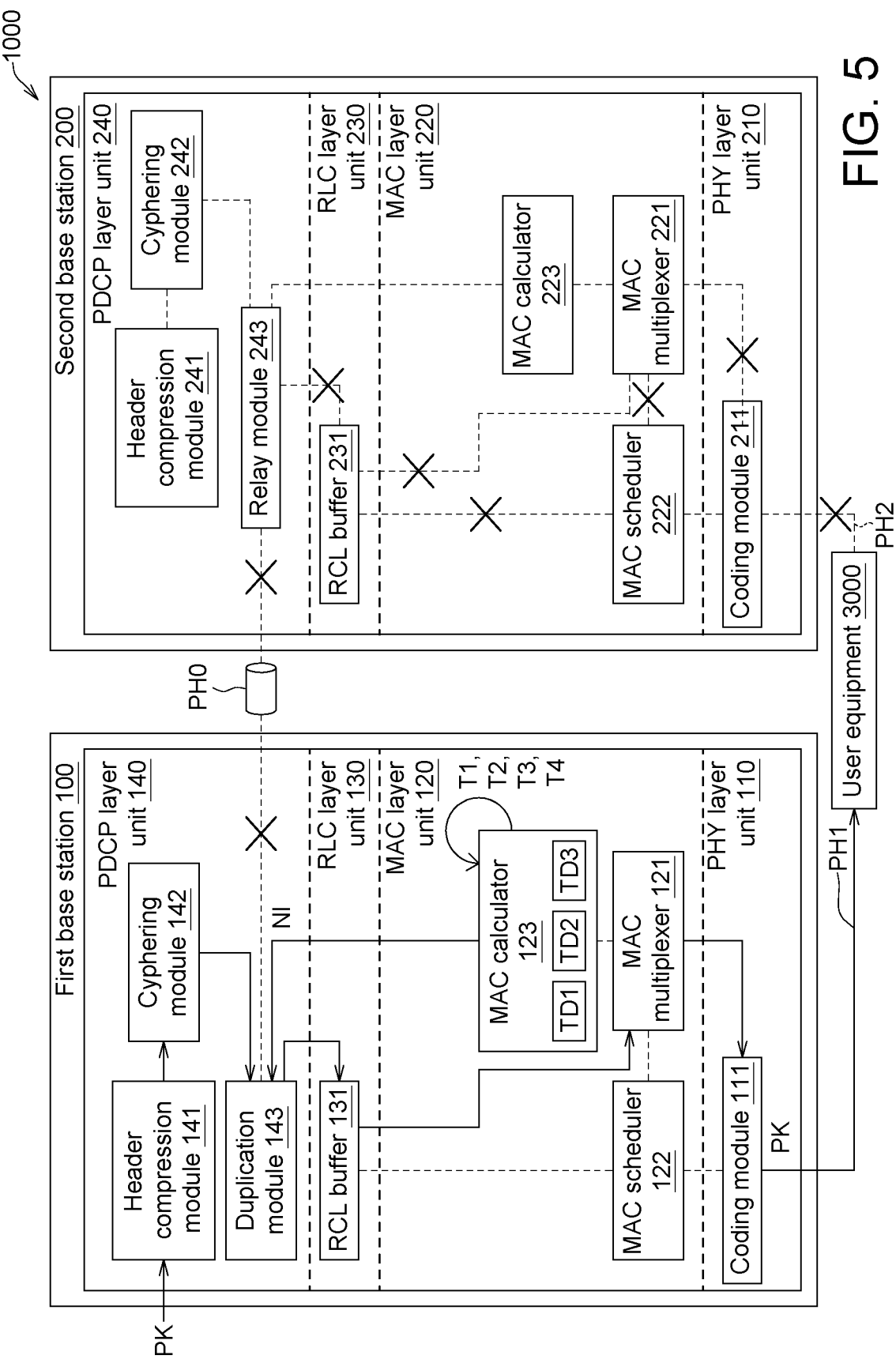
FIG. 5 is a schematic diagram of a co-transmission activation procedure.

Refer to FIGS. 3A to 5. FIGS. 3A to 3B are a flowchart of a data transmission method of the communication system 1000 according to an embodiment. FIG. 4 is a schematic diagram of a co-transmission pause procedure. FIG. 5 is a schematic diagram of a co-transmission activation procedure. As indicated in FIG. 4, the PDCP layer unit 140 includes a header compression module 141, a cyphering module 142 and a duplication module 143. The RLC layer unit 130 includes an RCL buffer 131. The MAC layer unit 120 includes a media access control multiplexer (MAC multiplexer) 121, a media access control scheduler (MAC scheduler) 122 and a media access control calculator (MAC calculator) 123. The MAC scheduler 122 of the MAC layer unit 120 is configured to arrange the transmission of the packet PK. The MAC calculator 123 of the MAC layer unit 120 is configured to analyze the information of the first transmission channel PH1 (such as the retransmission ratio and the transmission speed). The PHY layer unit 110 includes a coding module 111 and is configured to transmit with the user equipment 3000 through the first transmission channel PH1.

The PDCP layer unit 240 includes a header compression module 241, a cyphering module 242 and a relay module 243. The RLC layer unit 230 includes an RCL buffer 231. The MAC layer unit 220 includes an MAC multiplexer 221, an MAC scheduler 222 and an MAC calculator 223. The PHY layer unit 210 includes a coding module 211 and is configured to transmit with the user equipment 3000 through the second transmission channel PH2.

Refer to FIGS. 3A to 3B and FIG. 4. Firstly, the method begins at step S110, whether the retransmission ratio of the first transmission channel PH1 between the first base station 100 and the user equipment 3000 is higher than a first threshold T1 is determined by the MAC calculator 123 of the first base station 100. If the retransmission ratio of the first transmission channel PH1 is higher than the first threshold T1, the method proceeds to step S130; if the retransmission ratio of the first transmission channel PH1 is not higher than the first threshold T1, the method proceeds to step S120.

In step S120, whether the transmission speed of the first transmission channel PH1 is lower than a second threshold T2 is determined by the MAC calculator 123 of the first base station 100. If the transmission speed of the first transmission channel PH1 is lower than the second threshold T2, the method proceeds to step S130, if the transmission speed of the first transmission channel PH1 is not lower than the second threshold T2, the method returns to step S110.

That is, when the retransmission ratio of the first transmission channel PH1 is higher than the first threshold T1 and/or the transmission speed of the first transmission channel PH1 is lower than the second threshold T2, the method proceeds to step S130.

The order of step S110 and that of step S120 are exchangeable and are not limited to the exemplification of FIGS. 3A to 3B.

In step S130, a co-transmission activation command AI is emitted to the duplication module 143 by the MAC calculator 123 of the first base station 100.

Then, the method proceeds to step S140, after a packet PK is copied by the duplication module 143 of the first base station 100, the copied packet PK is transmitted to the second base station 200 through the base station inter-channel PH0.

Afterwards, the method proceeds to step S150, the copied packet PK is received by the relay module 243 of the second base station 200.

Then, the method proceeds to step S160, the copied packet PK is transmitted to the user equipment 3000 by the second base station 200 through the second transmission channel PH2.

In the above steps S110 to S160, although the first transmission channel PH1 is in a poor condition, the packet PK received by the first base station 100 still can be transmitted to the second base station 200 through the base station inter-channel PH0, and then is transmitted to the user equipment 3000 by the second base station 200 through the second transmission channel PH2.

Refer to FIGS. 3A to 3B and FIG. 5. Then, the method proceeds to step S170, whether the retransmission ratio of the first transmission channel PH1 is lower than a third threshold T3 is determined by the MAC calculator 123 of the first base station 100. If the retransmission ratio of the first transmission channel PH1 is lower than the third threshold T3, the method proceeds to step S180; if the retransmission ratio of the first transmission channel PH1 is not lower than the third threshold T3, the method returns to step S180. The third threshold T3 is smaller than the first threshold T1.

Then, the method proceeds to step S180, whether the transmission speed of the first transmission channel PH1 is higher than a fourth threshold T4 is determined by the MAC calculator 123 of the first base station 100. If the transmission speed of the first transmission channel PH1 is higher than the fourth threshold T4, the method proceeds to step S190; if the transmission speed of the first transmission channel PH1 is not higher than the fourth threshold T4, the method returns to step S170. The fourth threshold T4 is larger than the second threshold T2.

That is, the method proceeds to step S190 only when the retransmission ratio of the first transmission channel PH1 is lower than the third threshold T3 and the transmission speed of the first transmission channel PH1 is higher than the fourth threshold T4.

The order of step S170 and that of step S180 are exchangeable and are not limited to the exemplification of FIGS. 3A to 3B.

In step 190, a co-transmission pause command NI is emitted by the MAC calculator 123 of the first base station 100 to stop the action of copying the packet PK and to transmit the copied packet PK to the second base station 200.

In step S200, the transmission of the copied packet PK is stopped by the second base station 200.

In step S210, the packet PK is transmitted to the user equipment 3000 by the first base station 100 through the first transmission channel PH1.

Through the above steps S170 to S210, when the first transmission channel PH1 is in a good condition, the first base station 100 can directly transmit the received packet PK to the user equipment 3000 through the first transmission channel PH1 instead of copying the received packet PK and then transmitting the copied packet PK to the second base station 200.

After step S210, the method returns to step S110. The state of first transmission channel PH1 is examined again. As long as the first transmission channel PH1 is in poor condition, the second base station 200 is used to transmit the copied packet PK to the user equipment 3000; as long as the first transmission channel PH1 is in good condition, the first base station 100 is used to transmit the packet PK to the user equipment 3000.

To put it in greater details, as indicated in FIG. 4 and FIG. 5, the MAC calculator 123 of the MAC layer unit 120 includes a first thread TD1, a second thread TD2 and a third thread TD3. The first thread TD1 is configured to emit a co-transmission activation command AI when the retransmission ratio of the first transmission channel PH1 is higher than the first threshold T1. The second thread TD2 is configured to emits the co-transmission activation command AI when the transmission speed of the first transmission channel PH1 is lower than the second threshold T2. The third thread TD3 is configured to emit the co-transmission pause command NI when the retransmission ratio of the first transmission channel PH1 is lower than the third threshold T3 and the transmission speed of the first transmission channel PH1 is higher than the fourth threshold T4.

The first thread TD1, the second thread TD2 and the third thread TD3 only need to be loaded to the first base station 100 instead of the second base station 200, and the technology of the present embodiment can be implemented by the first thread TD1, the second thread TD2 and the third thread TD3.

To summarize, the collaboration technology of the first base station 100 and the second base station 200 of the present embodiment can reduce latency and increase reliability to meet the requirements of the ultra-reliable and low latency communications (uRLLC).

While the invention has been described by way of example and in terms of the preferred embodiment(s), it is to be understood that the invention is not limited thereto. On the contrary, it is intended to cover various modifications and similar arrangements and procedures and the scope of the appended claims therefore should be accorded the broadest interpretation so as to encompass all such modifications and similar arrangements and procedures.

What is claimed is:

1. A communication system, comprising:
 a first base station, comprising:
  a physical layer unit configured to transmit with a user equipment through a transmission channel;
  a media access control layer unit (MAC layer unit) configured to determine whether a retransmission ratio of the transmission channel is higher than a first threshold and to determine whether a transmission speed of the transmission channel is lower than a second threshold; and
  a packet data convergence protocol layer unit (PDCP layer unit); and
 a second base station;
 wherein if the retransmission ratio of the transmission channel is higher than the first threshold and/or the transmission speed of the transmission channel is lower than the second threshold, the MAC layer unit of the first base station emits a co-transmission activation command for enabling the first base station to copy a packet and then transmit the copied packet to the second base station which accordingly transmits the copied packet to the user equipment.

2. The communication system according to claim 1, wherein the MAC layer unit is further configured to determine whether the retransmission ratio of the transmission channel is lower than a third threshold and to determine whether the transmission speed of the transmission channel is higher than a fourth threshold;
 wherein if the retransmission ratio of the transmission channel is lower than the third threshold and the transmission speed of the transmission channel is higher than the fourth threshold, the MAC layer unit emits a co-transmission pause command to stop copying the packet and transmitting the copied packet to the second base station.

3. The communication system according to claim 2, wherein the third threshold is smaller than the first threshold.

4. The communication system according to claim 2, wherein the fourth threshold is larger than the second threshold.

5. The communication system according to claim 2, wherein the MAC layer unit comprises a media access control calculator (MAC calculator) having a first thread configured to emit the co-transmission activation command when the retransmission ratio of the transmission channel is higher than the first threshold.

6. The communication system according to claim 5, wherein the MAC calculator further has a second thread configured to emit the co-transmission activation command when the transmission speed of the transmission channel is lower than the second threshold.

7. The communication system according to claim 6, wherein the MAC calculator further has a third thread configured to emit the co-transmission pause command when the retransmission ratio of the transmission channel is lower than the third threshold and the transmission speed of the transmission channel is higher than the fourth threshold.

8. A data transmission method of a communication system, wherein the communication system comprises a first base station and a second base station, and the data transmission method comprises:
    determining, by the first base station, whether a retransmission ratio of a transmission channel between the first base station and a user equipment is higher than a first threshold;
    determining, by the first base station, whether a transmission speed of the transmission channel is lower than a second threshold;
    emitting, by the first base station, a co-transmission activation command to copy a packet and then transmit the copied packet to the second base station, which accordingly transmits the copied packet to the user equipment, if the retransmission ratio of the transmission channel is higher than the first threshold and/or the transmission speed of the transmission channel is lower than the second threshold.

9. The data transmission method of the communication system according to claim 8, further comprises:
    determining, by the first base station, whether the retransmission ratio of the transmission channel is lower than a third threshold;
    determining, by the first base station, whether the transmission speed of the transmission channel is higher than a fourth threshold;
    emitting, by the first base station, a co-transmission pause command to stop the action of copying the packet and transmitting the copied packet to the second base station, if the retransmission ratio of the transmission channel is lower than the third threshold and the transmission speed of the transmission channel is higher than the fourth threshold.

10. The data transmission method of the communication system according to claim 9, wherein the third threshold is smaller than the first threshold.

11. The data transmission method of the communication system according to claim 9, wherein the fourth threshold is larger than the second threshold.

12. The data transmission method of the communication system according to claim 9, wherein the first base station has a first thread configured to emit the co-transmission activation command when the retransmission ratio of the transmission channel is higher than the first threshold.

13. The data transmission method of the communication system according to claim 12, wherein the first base station further has a second thread configured to emit the co-transmission activation command when the transmission speed of the transmission channel is lower than the second threshold.

14. The data transmission method of the communication system according to claim 13, wherein the first base station further has a third thread configured to emit the co-transmission pause command when the retransmission ratio of the transmission channel is lower than the third threshold and the transmission speed of the data is higher than the fourth threshold.

15. A base station, comprising:
    a physical layer unit configured to transmit with a user equipment through a transmission channel;
    a media access control layer unit (MAC layer unit) configured to determine whether a retransmission ratio of the transmission channel is higher than a first threshold and to determine whether a transmission speed of the transmission channel is lower than a second threshold; and
    a packet data convergence protocol layer unit (PDCP layer unit);
    wherein if the retransmission ratio of the transmission channel is higher than the first threshold and/or the transmission speed of the transmission channel is lower than the second threshold, the MAC layer unit emits a co-transmission activation command for enabling the base station to copy a packet and then transmit the copied packet to an co-transmitting base station, which accordingly transmits the copied packet to the user equipment.

16. The base station according to claim 15, wherein the MAC layer unit is further configured to determine whether the retransmission ratio of the transmission channel is lower than a third threshold and to determine whether the transmission speed of the transmission channel is higher than a fourth threshold;
    if the retransmission ratio of the transmission channel is lower than the third threshold and the transmission speed of the transmission channel is higher than the fourth threshold, the MAC layer unit emits a co-transmission pause command to stop the action of copying the packet and transmitting the copied packet to the co-transmitting base station.

17. The base station according to claim 16, wherein the third threshold is smaller than the first threshold.

18. The base station according to claim 16, wherein the fourth threshold is larger than the second threshold.

19. The base station according to claim 16, wherein the MAC layer unit comprises an MAC calculator having a first thread configured to emit the co-transmission activation command when the retransmission ratio of the transmission channel is higher than the first threshold.

20. The base station according to claim 19, wherein the MAC calculator further has a second thread configured to emit the co-transmission activation command when the transmission speed of the transmission channel is lower than the second threshold.

* * * * *